2,885,379

FRICTION COMPOSITION COMPRISING CARBONIZED ELEMENTS HELD IN A MATRIX OF UNCARBONIZED MATERIAL AND METHOD FOR PREPARING SAME

Charles W. Taylor and Matthew E. Komp, Akron, Ohio, assignors to The Goodyear Tire & Rubber Company, Akron, Ohio, a corporation of Ohio No Drawing. Application July 15, 1955
Serial No. 522,386

8 Claims. (Cl. 260—38)

This invention relates to friction material and to a method of making the friction material for use with brakes, and particularly for disc brakes used in braking airplanes and other types of transportation vehicles.

Friction materials usually comprise as their essential components friction imparting fillers and a binder for these fillers. The binder and fillers are usually blended into a homogeneous mixture and then molded under heat and pressure into the desired size, shape and hardness. In the disc brake type of construction where a metal disc rotates in fixed relation with a vehicular wheel between two friction elements, it becomes extremely difficult to construct and assemble the parts so that the contacting surfaces of the disc and the friction elements are perfectly parallel to each other. Even when this condition is approached, it is observed that under severe braking conditions, vibrations develop between the disc and the friction elements to such an extent as to further decrease the effective area of the elements in braking or frictional contact with the disc. When this happens, a greater force is required to develop the friction necessary to reduce the momentum of a vehicle, and as a result localized heat and wear are developed with the result that less service and braking efficiency is obtained from the friction element.

It has now been discovered that a friction element may be made using conventional fillers and binders that will maintain constant braking contact between the friction element and, for example, the disc of a disc brake construction throughout the entire braking operation regardless of braking conditions or brake construction. This improved braking contact is made possible by means of the friction elements of this invention because of the novel manner in which these elements are manufactured.

It has been discovered that an improved friction material may be made from a compounded friction composition containing a conventional friction imparting filler and a binder by providing a plurality of friction elements or friction producing zones of carbonized friction composition interspersed with and in bonded relationship with a plurality of friction elements or friction producing zones of uncarbonized friction composition. The improved friction material is made from a mixture of carbonized and uncarbonized comminuted particles of friction composition comprising a friction imparting filler and an organic heat hardenable binder which mixture is then baked and compacted under sufficient heat and pressure to harden the binder portion of the uncarbonized particles and thereby form the mixture of particles into a unitary bonded mass.

It is observed that the carbonized particles are of a softer nature than the uncarbonized particles and as a result the uncarbonized particles have a greater load carrying capacity than the carbonized particles. It is believed that this difference in load carrying capacity permits a more even distribution of forces over the face of the friction element and as a result a more even distribution of frictional wear which further results in a substantially equal braking action over the entire face or surface of the friction element with the still further result that the braking action of the friction element is dependable and efficient. It is also believed that the dependable and efficient operation of the friction material of this invention is due to the formation of a continuous phase or matrix of uncarbonized friction composition having the voids thereof filled with carbonized friction composition, the matrix functioning to evenly distribute the braking pressure to each of the surfaces of the many isolated carbonized and uncarbonized friction elements.

The compounded friction composition used in this invention is made by blending any of the desired conventional fillers with any of the desired conventional organic binders using a solvent in order to facilitate the blending of these various ingredients. A convenient procedure for blending the fillers with the binder is to first add asbestos fiber to a conventional mixer and then add the binder comprising, for example, a heat convertible, thermosetting, organic resin and a rubber such as polychloroprene or the rubbery copolymer of butadiene-1,3 and acrylonitrile in a solvent for the resin and the rubber until the asbestos fiber and the solution of binder are thoroughly mixed into a dough. To this mixture is then added the other fillers ordinarily used in the manufacture of friction material, including talc, clay, slate, rotten stone, mica, wood flour, metal chips and powders, fiber glass, felt, metal oxides, silica, chalk, graphite, metal nitrides, carbon black, etc., each contributing a desired characteristic to the finished friction element such as resistance to wear, coefficient of friction, energy absorption, thermal conductivity, resistance to fracture, lubrication and other desirable properties. Curing agents necessary in bringing about the cure and set of the binder are also added and thoroughly mixed. This mixture may be heated while being mixed to drive off the solvent. This dried mixture is then removed from the mixer and run through a grinder to reduce the individual particles of the dried mass to substantially uniform size, and the mass to a loose comminuted condition with little, if any, tendency for the ground mass to hold together when compressed with the fingers. This ground and dried mixture of friction material is the raw friction composition from which the friction elements of this invention are made.

A portion of this raw compound is spread on trays in comminuted form and heated or baked sufficiently to volatilize and carbonize the binder components. The baked and carbonized composition is similar to the raw compound in physical appearance, the only difference being that the baked compound is now of a darker hue, approaching black. The carbonized friction composition may be run through a grinder to break up the carbonized mass into a loose comminuted particle mixture or comminution may be depended upon during blending of the carbonized friction composition in a tumbler with the raw compound.

The carbonized compound is then mixed with the raw compound in a suitable tumbler in various portions ranging from 20% to 80% of the one to 80% to 20% of the other. This blend of the raw compound and the carbonized compound is then compacted or molded into a desired brake lining shape under pressure and baked under heat sufficient to convert the binder present in the raw compound to an infusible form, but without causing the binder to become carbonized or partially sintered. The blend of carbonized and uncarbonized friction composition may be compacted in a mold under a pressure of from about 5000 to 15,000 pounds per sq. in., it being preferred to use a pressure of about 10,000 pounds per sq. in. The blend may be baked at a temperature of from about 275° F. to about 400° F. and for a period of time sufficient to convert the heat hardenable binder to an infusible mass. It is preferred to bake the blend at a temperature of 300° F. to 350° F. for about ½ hour. Baking conditions are never used in which the binder in the uncarbonized portion of the blend is caused to become carbonized. The baked uncarbonized friction material has a higher hardness or greater load bearing capacity than is possessed by the embedded carbonized material. These molded friction elements are then finished to the proper size and assembled with any conventional holding device and installed in a brake construction ready for service.

More specifically, the friction element of the present invention may be made in accordance with the following example, in which the parts are by weight:

*Example 1*

The following components were used in making the raw friction composition from which a friction element of this invention was made:

|  | Parts |
|---|---|
| Asbestos fiber | 100 |
| Binder | 100 |
| Barium sulfate | 20 |
| Copper powder | 15 |
| Brass chips | 100 |
| Lead powder | 15 |
| Talc | 25 |

The binder of the foregoing formulation comprised the following components:

|  | Parts |
|---|---|
| Phenol-formaldehyde resin | 170 |
| Hexamethylenetetramine | 10 |
| Rubbery copolymer of butadiene and acrylonitrile 75/25 | 20 |
| Methyl ethyl ketone as the solvent for the resin and the rubber | 250 |

The asbestos fibers and binder were mixed in a conventional dough mixer until a relatively homogeneous dough was obtained and then the fillers were added to this dough and mixing continued at a temperature of 120° F. until substantially all of the solvent had been removed. The resulting mixture was then passed through a grinder to reduce the raw friction composition to a loose fibrous uniform particle mass having a light gray color and having little or no tendency to pack when compressed by the fingers.

A portion of this raw friction composition in comminuted form was exposed on a tray in a layer ½" thick in an oven at a temperature of 650° F. until the volatile portion of the composition was driven off and the carbonizable binder portion was carbonized. The temperature of the composition rose to 800° F. during carbonization of the composition. The carbonizing operation required about 15 minutes.

Fifty parts of this carbonized material was mixed with 50 parts of the raw compound and placed in a mold under 10,000 pounds per sq. in. of pressure and baked under this pressure for ½ hour at 325° F.

A friction element of this invention was assembled in a braking system of the disc brake type and tested in an inertia dynamometer capable of absorbing 827,000 foot pounds of kinetic energy in 12.5 seconds using 6 friction discs 2" in diameter bearing against a 10" S.A.E. 1035 medium carbon steel braking disc ⅜" thick, 6 friction discs being positioned so that 3 discs are opposite three other discs on opposite sides of the steel braking disc. A friction element made in accordance with the present invention developed a coefficient of friction of 0.405 and an average wear per stop of 0.00146 inch.

For comparison in performance, a standard friction element was made from raw compound alone by molding the compound under a pressure of 10,000 pounds per sq. in. and baking under a temperature of 325° F. for ½ hour. The compound was then baked in an oven in which the temperature was gradually increased to 550° F. and then held at 550° F. for 1 hour. Under test this standard brake element developed a coefficient of friction of only 0.345 and an average wear per stop of 0.001925 inch.

After these friction elements had been used to make 50 stops of the dynamometer, a torque chart reading of the 51 stop was made. The friction element of the present invention produced a relatively straight and smooth torque curve in which an initial braking torque of 1000 foot pounds down to a torque of 900 was developed during the first 3 seconds of braking time, then gradually back to a torque of 1000 for most of the remainder of the braking time and then up to a torque of 1050 during the last 1.5 seconds of braking time. A much more erratic torque curve was produced by the standard friction element made for comparison as described above in which an initial braking torque of 950 foot pounds was developed which then dropped off sharply within a period of 3 seconds to a torque of 750 and then very erratically between a gradual torque spread of from 50 to 150 foot pounds in about 30 separate surges from an average minimum torque of 850 to an average maximum torque of 1150 during the remaining 7.5 seconds of braking time. This performance is the result of proper frictional contact in the case of the relatively straight and smooth torque for the friction element of this invention and the result of improper frictional contact in the case of the erratic torque curve for the standard friction element.

The binder component of the friction element of this invention may be composed of any suitable heat hardenable, organic, resinous composition. Small amounts of a rubbery material, or a drying oil, may be added to the resinous composition in order to improve the resistance of the friction element to fracture. Heat convertible or heat hardenable organic resins include the aldehyde condensation products with a phenol such as phenol, with a melamine, with a cashew nutshell liquid, with aniline, with cyanimide, with a ketone, or with a urea or tannin. The preferred binder of the present invention comprises a mixture of a heat hardenable resin, such as the condensation product of formaldehyde and a phenol, which may be used in amount from about 60 to about 97 parts, and a rubbery copolymer of butadiene-1,3 and acrylonitrile, commonly referred to as Buna N, which may be used in amount from about 3 parts to about 40 parts each per 100 parts by weight of combined resin and rubber. The resin of phenol and formaldehyde may be made using equal molecular proportions of each of the reactants or a molecular excess of the formaldehyde reactant up to 2 mols per mol of phenol. The resin used in Example 1 employed the use of equal molecular proportions of both phenol and formaldehyde with excess formaldehyde being added through the use of hexamethylenetetramine to convert the resin into an insoluble state.

By the term "carbonized" is meant the presence of carbon resulting from the carbonization of carbonizable material and the absence of volatile material volatilizable during carbonization.

While certain representative embodiments and details have been shown for the purpose of illustrating the invention, it will be apparent to those skilled in this art that various changes and modifications may be made therein without departing from the spirit or scope of the invention.

What is claimed is:

1. The method of making friction material from a mixture comprising friction imparting filler material and a heat hardenable carbonizable binder therefor comprising a phenol/formaldehyde resin, which method comprises heating said mixture at a temperature of about 650° F. to about 800° F. for a period of time sufficient to drive off volatile material and carbonize the binder, blending 20 to 80 parts of the carbonized material with 80 to 20 parts of a binder composition comprising a friction imparting filler material and from about 60 to about 97 parts of a heat hardenable carbonizable phenol/formaldehyde resin and from about 40 to about 3 parts of a rubbery diene polymer selected from the group consisting of polychloroprene and a rubbery copolymer of butadiene-1,3 and acrylonitrile, and then heating the resulting blend under pressure of from about 5,000 to about 15,000 pounds per square inch and at a temperature of from about 275° F. to about 400° F. for a period of time sufficient to harden said binder but insufficient to carbonize said binder composition.

2. The method of making friction material from a mixture comprising friction imparting filler material and a heat hardenable carbonizable binder therefor comprising a phenol/formaldehyde resin, which method comprises heating a portion of the mixture at a temperature of about 650° F. to about 800° F. for a period of time sufficient to drive off the volatile material and carbonize the binder, blending 20 to 80 parts of the carbonized material with 80 to 20 parts of additional said mixture and then heating the resulting blend under pressure of from about 5,000 to about 15,000 pounds per square inch and at a temperature of from about 275° F. to about 400° F. for a period of time sufficient to harden said binder but insufficient to carbonize said binder.

3. The method of making friction material from a mixture comprising friction imparting filler material and a heat hardenable binder comprising a phenol/formaldehyde condensation resin and a rubbery copolymer of butadiene-1,3 and acrylonitrile, which method comprises heating a portion of the mixture at a temperature from about 600° F. to about 800° F. in comminuted form to drive off volatile material and carbonize carbonizable material, blending 20 to 80 parts of the heated material in comminuted form with 80 to 20 parts of additional said mixture in comminuted form and then heating the resulting blend under pressure of from about 5,000 to about 15,000 pounds per square inch and at a temperature of from about 275° F. to about 400° F. for a period of time sufficient to mold the blend into a unitary mass.

4. A friction composition comprising 20 to 80 parts of carbonized friction elements held in a matrix of 80 to 20 parts of uncarbonized friction material, said carbonized friction elements comprising a carbonized binder resulting from the heat treatment of a heat convertible phenol/formaldehyde resin at a temperature of about 650° F. to about 800° F. and a friction imparting filler held by the carbonized binder, said matrix material comprising a carbonizable binder of a heat convertible phenol-formaldehyde resin and a friction imparting filler held by the carbonizable binder, the material being formed into a matrix by heating the matrix material in the presence of the carbonized friction elements to a temperature of from about 275° F. to about 400° F. and at a pressure of from about 5,000 to about 15,000 pounds per square inch for a period of time sufficient to convert the matrix material into a unitary bonded mass.

5. The friction composition of claim 4 in which the elements and matrix material contain a rubbery diene polymer selected from the group consisting of polychloroprene and a rubbery copolymer of butadiene-1,3 and acrylonitrile.

6. The friction composition of claim 4 in which the elements and matrix material are each present in the amount of 50 parts by weight based upon the total weight of each present.

7. A friction composition comprising a discontinuous phase of carbonized friction elements held in a continuous phase of uncarbonized friction material, said carbonized friction elements comprising a carbonized binder resulting from the heat treatment of a phenol/formaldehyde resin at a temperature of about 650° F. to about 800° F. and a friction imparting filler held by the carbonized binder, said continuous phase material comprising a carbonizable binder of a phenol/formaldehyde resin and a friction imparting filler held by the carbonizable binder and being formed into a continuous phase of reticulate structure by heating the material in the presence of the carbonized friction elements to a temperature of from about 275° F. to about 400° F. and at a pressure of from about 5,000 to about 15,000 pounds per square inch for a period of time sufficient to convert the material into a fused mass.

8. The method of making friction material from an uncarbonized mixture comprising a resinous heat-hardenable phenol/formaldehyde binder and at least one of a friction imparting filler selected from the group consisting of talc, clay, slate, rotten stone, mica, wood flour, metal chips, metal powder, fiber glass, metal oxides, silica, chalk, graphite, metal nitride and carbon black, which method comprises heating said mixture at a temperature of from about 600° F. to about 800° F. for a period of time sufficient to drive off volatile material and carbonize the binder, blending 20 to 80 parts of the carbonized mixture with 80 to 20 parts of additional said uncarbonized mixture and then heating the resulting blend at a temperature of from 275° F. to about 400° F. at a pressure of from about 5,000 to about 15,000 pounds per square inch and for a time sufficient to mold the blend into a unitary mass in which the uncarbonized mixture forms a matrix the voids of which contain the carbonized mixture.

References Cited in the file of this patent

UNITED STATES PATENTS

| | | |
|---|---|---|
| 1,804,052 | Haas | May 5, 1931 |
| 2,110,571 | Elerath | Mar. 8, 1938 |
| 2,344,189 | Waldie | Mar. 14, 1944 |
| 2,394,783 | Keller | Feb. 12, 1946 |
| 2,569,539 | Schultz | Oct. 2, 1951 |
| 2,587,945 | Wirth | Mar. 4, 1952 |